July 21, 1964     M. ALTMAN     3,141,987
CAMERA AND TEMPERATURE-CONTROLLING JACKET
Filed June 1, 1961     3 Sheets-Sheet 1

INVENTOR.
MORRIS ALTMAN

BY

ATTORNEY

July 21, 1964 M. ALTMAN 3,141,987
CAMERA AND TEMPERATURE-CONTROLLING JACKET
Filed June 1, 1961 3 Sheets-Sheet 2

INVENTOR.
MORRIS ALTMAN
BY
ATTORNEY

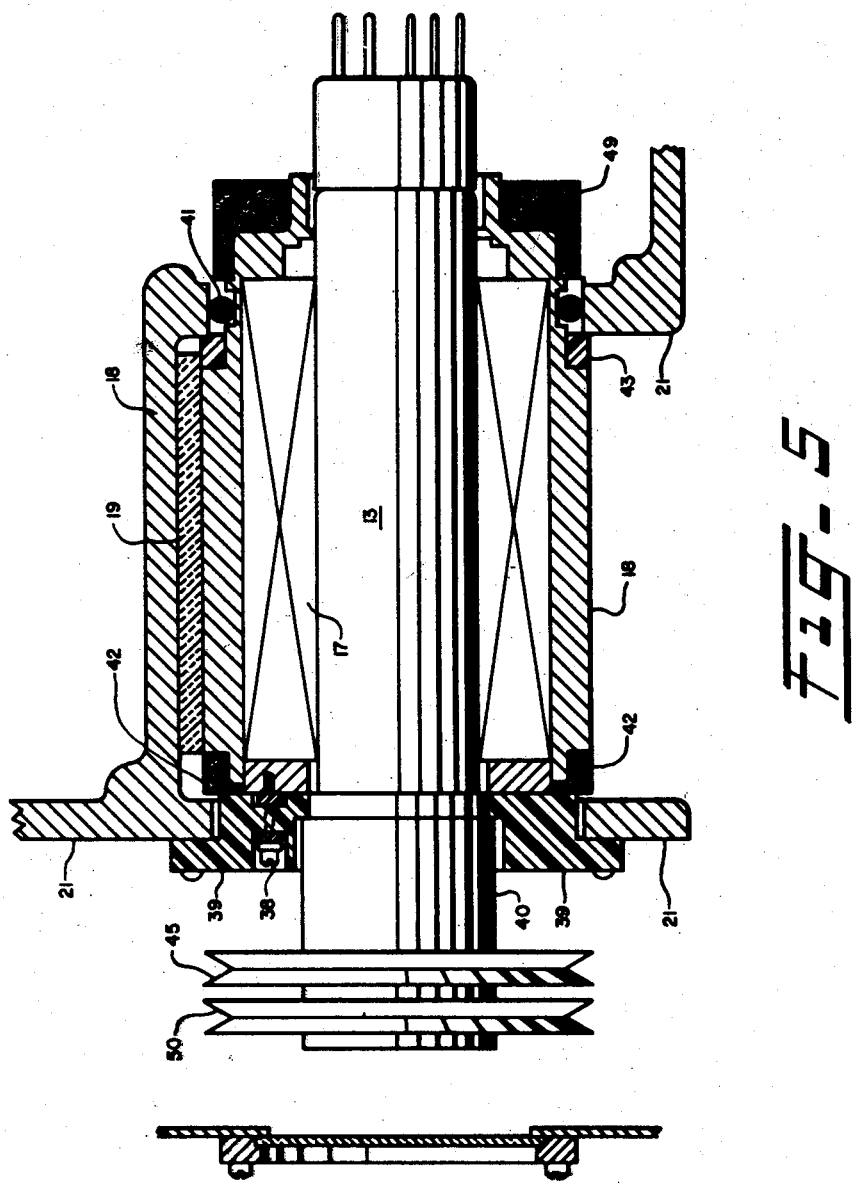

United States Patent Office 3,141,987
Patented July 21, 1964

3,141,987
CAMERA AND TEMPERATURE-CONTROLLING JACKET
Morris Altman, Putnam Valley, N.Y., assignor to General Precision, Inc., a corporation of Delaware
Filed June 1, 1961, Ser. No. 114,122
2 Claims. (Cl. 313—17)

This invention relates to temperature control apparatus for cameras and particularly to the combination of a temperature-controlling jacket and a camera therein.

Some cameras are particularly sensitive to temperature. This is particularly true of television cameras, which are very sensitive to above-normal temperatures. The camera or pickup tubes of television cameras lose effectiveness as their temperature is increased. As one example, photoresistive camera tubes begin to lose effectiveness when their temperature is increased to 100° F. and at about 140° F. these tubes are practically completely ineffective.

There are also situations in which cameras function poorly in cold temperatures, when they should be heated to an appropriate temperature for good operation.

Conventional methods of camera cooling cannot be used in some cases. For example, with an ambient temperature of 140° F. at a mobile camera, and near a source causing considerable radiant heating, a conventional refrigeration element cannot be placed at the camera and when placed remotely becomes ineffective and adequate cooling becomes impractical.

The present invention employs the Peltier effect, that is, the cooling or heating effect caused when an electric current is passed through a junction of two dissimilar metals or semiconductors. In a preferred embodiment a camera case or jacket is constructed as a box having a finned exterior and an interior cavity fitting the camera. Each wall of the box is of "sandwich" construction, being composed of two metal sheets forming the inner and outer surfaces, with blocks separating the sheets and in thermally conductive contact with them. The blocks are composed of a material exhibiting the Peltier effect. When a direct-current source is connected to the two ends of each block, passing a current through them, the inner ends of the blocks and inner sheet become cold while the outer sheet becomes hot. An air blast is directed at the fins on the outside of the outer sheet to remove its heat, and the camera within the cavity surrounded by the cooled, inner sheet is cooled to a suitable working temperature.

If the direction of the supplied current is reversed, the inner wall becomes warm and the outer wall cool, thus tending to warm the camera.

Suitable materials for the blocks exhibiting the Peltier effect are well known. For example, a partial list includes the compounds bismuth telluride and lead telluride. It is necessary to employ an alloy having substantially no accidental impurities, and in most cases it is preferred to add a small amount, of the order of 1%, of a "promoter" or impurity element, such as sodium, potassium, thallium, cupric sulphide, silver selenide, chlorine, bromine, iodine, uranium, tantalum, manganese, zirconium, titanium, aluminum, gallium, niobium, silver, gold.

One object of this invention is to provide a case for cooling a camera.

Another object of this invention is to provide a case for heating a camera.

Another object is to provide a case partly surrounding a television camera for cooling or heating it.

Another object is to provide a camera case containing components exhibiting the Peltier effect so that when an electric current is passed through the components the contained camera is either cooled or heated, depending on the direction of the current.

Another object is to provide a combination of a camera and partly surrounding case for cooling the camera by use of the Peltier effect in components of the case.

A further understanding of the invention can be secured from the detailed description and drawings, in which:

FIGURE 5 is a cross-section of the camera tube assembly and supporting members taken on the plane 5—5, FIGURE 1.

Figure 1:
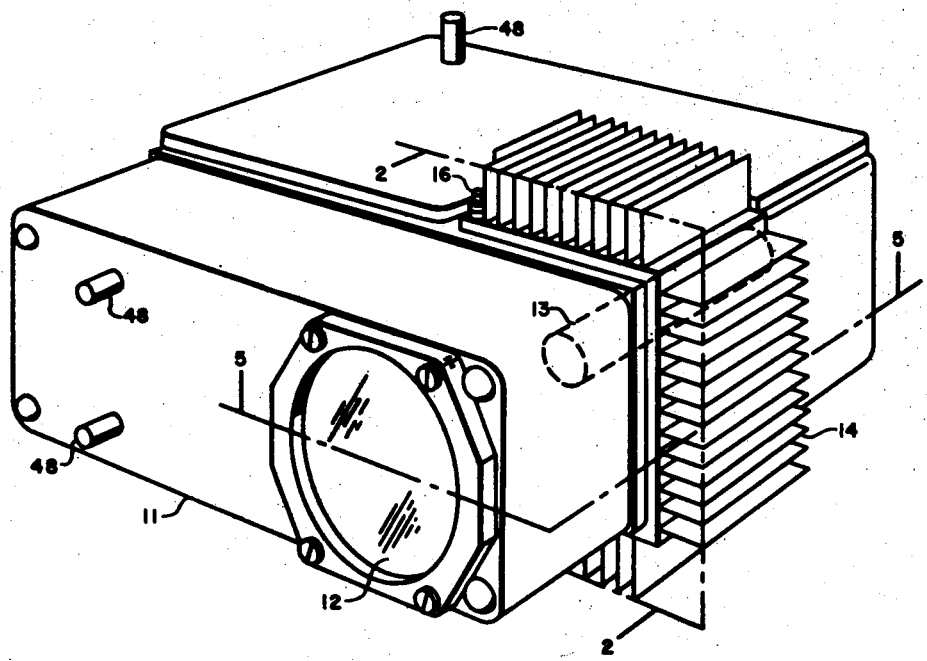
FIGURE 1 is an oblique view of a television camera and its cooling jacket.

Referring now to FIGURE 1, a television camera 11 is shown having a transparent object glass plate 12. The television camera tube 13, positioned some distance behind the plate 12, may be a vidicon tube, which is of the photoconductive type. The tube and associated coils and its square supporting frame are surrounded on three sides by a finned thermoelectric unit 14, the camera case being cut away so that the thermoelectric unit fits snugly around the camera tube assembly. The unit 14 has two electrical terminals, of which one, 16, is shown, for applying electric power to it.

Figure 2:
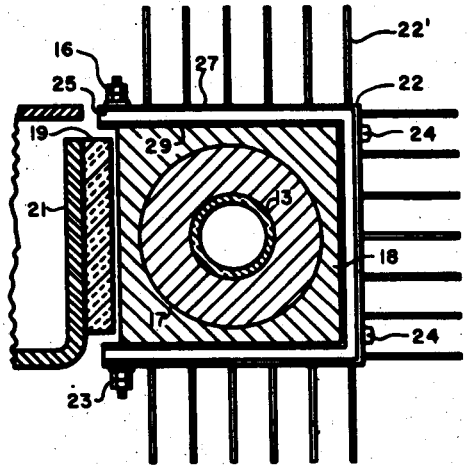
FIGURE 2 is a cross-section of the television camera tube assembly and an end view of its cooling jacket in a plane normal to the tube axis, the plane being indicated by the plane 2—2, FIGURE 1.

A cross-section of the camera perpendicular to its axis and a view of the end of the cooling unit 14 are shown in FIGURE 2. The vidicon tube 13 is surrounded by deflection and focussing coils 17, which in turn are surrounded by a brass block 18 serving as a supporting and heat conducting frame for the tube and associated coils. A thermally insulating pad 19 separates the fourth side of the vidicon camera tube assembly from the remainder of the camera. An aluminum casting 21 constitutes part of the camera's main frame. The cooling unit comprises a box body, 22, having an outer shell or wall 27 and an inner shell or wall 29. The end view of FIGURE 2 shows the edges of these two walls and the exposed end, 25, between them, consisting of a cold insulating and cementing material such as a poured epoxy compound. This material has the double function of cold insulation and of mechanically connecting the walls 27 and 29 into a unitary structure. This structure 22 carries the two binding posts 16 and 23, and its outer surface is provided with cooling fins 22' on all three sides. The box 22 is screwed directly to the brass camera block 18 by screws 24.

Figure 3:
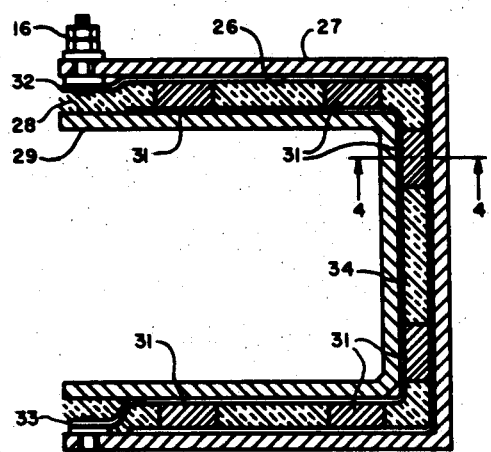
FIGURE 3 is a cross-section view of the cooling unit 14 through the terminal binding posts, exposing the interior of box 22. Fins are omitted.

The internal construction of the box 22 is indicated in FIGURE 3. The inner surface 26 of the aluminum sheet 27 forming the outer wall of the box is anodized, so that it is electrically insulating while losing very little thermal conductivity. The outer surface 28 of the aluminum sheet 29 forming the inner wall of the box is also anodized and electrically nonconductive. The blocks or pellets 31 are made of an alloy exhibiting the Peltier effect, four such blocks being symmetrically placed within each of the three hollow walls of the box 22. All of the outer ends of the blocks are joined electrically by a metal strap 32 connected to the binding post 16, and all of the inner ends of the blocks are joined electrically by a metal strap 33 connected to the binding post 23. The interface spaces 34 between the blocks 31 are filled with solid insulation material, such as epoxy compound, also serving to connect the two walls together.

Instead, of connecting all of the blocks electrically in series, as described, they may alternatively be placed in parallel, or in a series-parallel connection.

Figure 4:
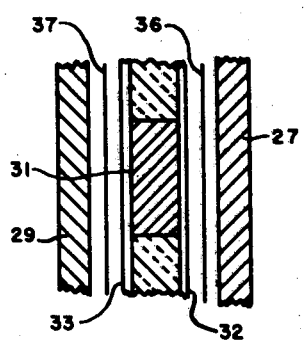
FIGURE 4 is an exploded cross-section view of a part of the cooling unit box taken on the line 4—4, FIGURE 3.

The described construction is shown more clearly in the exploded view of FIGURE 4, in which the anodized layer on the inner surface of the outer wall is indicated by the line 36, and the anodized layer on the outer surface of the inner wall is indicated by the line 37.

In order to protect the camera tube from physical shock it is necessary to shock mount the camera assembly. It is also necessary to protect the camera tube assembly from heat conductively transmitted from other parts of the camera. To accomplish both of these purposes simultaneously, the camera tube assembly is carefully isolated at several points by paper base phenolic elements. At other points the camera tube assembly is thermally insulated by sealed air cell foam plastic as at 19, FIGURE 2. The assembly is rubber shock mounted at its ends.

This is shown in FIGURE 5. The vidicon tube 13, surrounded by its coils 17 and they by the brass block 18 constitutes the camera tube assembly. The object end of the tube is connected to a phenolic plate 39 through a shock mounting consisting of four rubber-washer isolated screws, such as screw 38. The plate 39 is secured by screws to the main camera frame 21. The base end of the camera tube assembly is supported by an O-ring 41 positioned in an opening of the main frame 21. The lens assembly indicated by the tube 40 is screwed into the phenolic plate 39. The pulley wheels 45 and 50 form part of a mechanism for remote control of the iris opening and for focussing.

To protect the end of the block 18 from heat radiated by the frame 21, a phenolic spacer ring 43 is inserted between the block and the frame. Foam insulating material is inserted in the spaces 42 and 49 to reduce heat transfer by convection and radiation at these points.

The operation of the Peltier effect cooling unit raises the temperature of the outer skin of the hollow box 22 by some amount above a mean temperature while the inner skin is lowered in temperature by a like amount below the mean temperature. This mean temperature can be taken as the ambient air temperature, which in this case is assumed to be +140° F. Since it is desired, by creating a temperature difference of 50° F. between the two plates, to maintain the vidicon tube temperature at not over +100° F., obviously forced cooling of the fins is desirable to reduce the mean temperature. This is done by forcing ambient air, at about 140° F., rapidly past the fins. In order to prevent the remainder of the camera from rising much above this temperature, the same air is caused to flow over the entire exterior of the camera.

Figure 6:
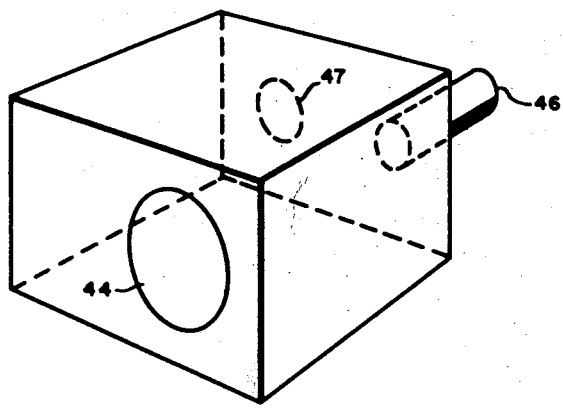
FIGURE 6 is an oblique view of a box intended to surround the camera of FIGURE 1 for the purpose of directing high velocity cooling air past the fins and all sides of the camera.

This is done by surrounding the camera shown in FIGURE 1 by a box as shown in FIGURE 6. The aperture 44 is left open for air egress and to permit light from the object being televised to enter the camera. Ambient air under pressure, provided by a source not shown, is passed through the air pipe 46. The dashed circle 47 indicates a thermally protected opening for electric cables. The entire box is firmly secured to the camera, which is provided with metal bosses as shown at 48, FIGURE 1, so that an air channel of about one-half inch is left between the camera and the surrounding box everywhere except at the fins, where the clearance is less.

When the camera is used near furnaces or other high temperature sources which could radiate heat to it, the camera box of FIGURE 6 should be substantially heat reflecting. This is accomplished by making the box of aluminum, with a highly reflecting external surface.

When the camera assembly is not subject to heating by radiation, simpler means of holding the fin temperature at or near the ambient temperature can be used. For example, the box of FIGURE 6 can be omitted and, if necessary, a fan placed to blow ambient air past the fins.

In the operation of this camera and its temperature-controlling jacket, an electrical current of, for example, 18 amperes at 2 volts is sent into the binding post 16 and out the binding post 23. This current, flowing through the alloy blocks 31, causes their outer ends, in thermal contact with the wall 27, to become heated while their inner ends, in thermal contact with the wall 29, are cooled. A temperature difference of 50° F. is thus generated between the walls 29 and 27. The heat of the outer wall 27 is drained away by the fins to the air forced past them. Thus, when the fins are at a temperature of 140° F., the inner wall 29 and the camera enclosed by it are maintained at a temperature of about +90° F.

What is claimed is:

1. A combination television camera and temperature controlling jacket comprising,
    a television camera including a pickup tube,
    deflection coils surrounding the neck of said pickup tube,
    a case enclosing said television camera, said case being cut away to expose said pickup tube in the region of said deflection coils,
    a heat conducting metallic block in intimate contact with said deflection coils,
    a double wall U-shaped jacket having inner and outer walls, said outer wall being provided with fins on its exterior surface, said inner wall being constructed to form a close fit with three of four outer surfaces of said metallic block,
    a heat insulating pad interposed between the fourth outer surface of said metallic block and the remainder of the camera case,
    a plurality of metallic blocks mechanically connecting the inner and outer walls of said U-shaped jacket, said blocks being joined to both walls by junctions having low thermal but high electrical resistance,
    said blocks consisting of a material capable of generating a temperature difference by the Peltier effect, and
    means for applying an electrical current to said blocks to lower the temperature of said metallic block.

2. The combination as set forth in claim 1 including a boxlike structure completely enclosing said camera, camera case and said jacket, said boxlike structure having openings for the ingress and egress of air, and
    means for forcing air around said camera case and between the fins of said outer wall.

References Cited in the file of this patent

UNITED STATES PATENTS

| | | |
|---|---|---|
| 2,241,974 | Anderson et al. | May 13, 1941 |
| 2,385,530 | Paille | Sept. 25, 1945 |
| 2,734,344 | Lindenblad | Feb. 14, 1956 |
| 2,777,975 | Aigrain | Jan. 15, 1957 |
| 2,967,254 | Forgue | Jan. 3, 1961 |
| 3,008,299 | Sheckler | Nov. 14, 1961 |